US009031345B2

(12) United States Patent
Jin et al.

(10) Patent No.: US 9,031,345 B2
(45) Date of Patent: May 12, 2015

(54) OPTICAL FLOW ACCOUNTING FOR IMAGE HAZE

(71) Applicant: Adobe Systems Incorporated, San Jose, CA (US)

(72) Inventors: Hailin Jin, San Jose, CA (US); Zhuoyuan Chen, Evanston, IL (US); Zhe Lin, Fremont, CA (US); Scott D. Cohen, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 78 days.

(21) Appl. No.: 13/794,408

(22) Filed: Mar. 11, 2013

(65) Prior Publication Data

US 2014/0254943 A1    Sep. 11, 2014

(51) Int. Cl.
*G06K 9/40*    (2006.01)
*G06T 5/00*    (2006.01)

(52) U.S. Cl.
CPC .................................... *G06T 5/003* (2013.01)

(58) Field of Classification Search
None
See application file for complete search history.

(56) References Cited

U.S. PATENT DOCUMENTS

| | | | |
|---|---|---|---|
| 5,351,095 A | 9/1994 | Kerdranvat | |
| 5,729,008 A | 3/1998 | Blalock et al. | |
| 5,749,073 A | 5/1998 | Slaney | |
| 7,711,180 B2 | 5/2010 | Ito et al. | |
| 8,205,148 B1 | 6/2012 | Sharpe et al. | |
| 8,290,294 B2 * | 10/2012 | Kopf et al. | 382/274 |
| 8,340,461 B2 * | 12/2012 | Sun et al. | 382/275 |
| 8,346,751 B1 | 1/2013 | Jin et al. | |
| 8,588,551 B2 * | 11/2013 | Joshi et al. | 382/294 |
| 8,675,962 B2 * | 3/2014 | Mori et al. | 382/168 |
| 2004/0218834 A1 | 11/2004 | Bishop et al. | |
| 2005/0069207 A1 * | 3/2005 | Zakrzewski et al. | 382/190 |
| 2006/0147087 A1 | 7/2006 | Goncalves et al. | |
| 2007/0242900 A1 | 10/2007 | Chen et al. | |
| 2007/0273653 A1 | 11/2007 | Chen et al. | |
| 2008/0278584 A1 | 11/2008 | Shih et al. | |
| 2009/0110076 A1 | 4/2009 | Chen | |
| 2009/0297059 A1 * | 12/2009 | Lee et al. | 382/275 |
| 2010/0272311 A1 | 10/2010 | Nir et al. | |
| 2011/0026596 A1 | 2/2011 | Hong | |
| 2011/0043603 A1 * | 2/2011 | Schechner et al. | 348/25 |
| 2012/0027295 A1 | 2/2012 | Shao | |
| 2012/0105728 A1 | 5/2012 | Liu | |
| 2012/0151320 A1 | 6/2012 | McClements, IV | |

(Continued)

OTHER PUBLICATIONS

Zhang et al., "Video dehazing with spatial and temporal coherence", Vis Comput (2011) 27: 749-757, Jun. 2011.*

(Continued)

*Primary Examiner* — Anand Bhatnagar
*Assistant Examiner* — Soo Park
(74) *Attorney, Agent, or Firm* — Wolfe-SBMC

(57) ABSTRACT

In embodiments of optical flow accounting for image haze, digital images may include objects that are at least partially obscured by a haze that is visible in the digital images, and an estimate of light that is contributed by the haze in the digital images can be determined. The haze can be cleared from the digital images based on the estimate of the light that is contributed by the haze, and clearer digital images can be generated. An optical flow between the clearer digital images can then be computed, and the clearer digital images refined based on the optical flow to further clear the haze from the images in an iterative process to improve visibility of the objects in the digital images.

20 Claims, 5 Drawing Sheets

(56) References Cited

U.S. PATENT DOCUMENTS

| | | | |
|---|---|---|---|
| 2013/0136364 | A1 | 5/2013 | Kobayashi |
| 2013/0230247 | A1 | 9/2013 | Schlosser et al. |
| 2013/0235201 | A1* | 9/2013 | Kiyohara et al. ............. 348/148 |
| 2014/0133675 | A1 | 5/2014 | King et al. |
| 2014/0205141 | A1 | 7/2014 | Gao et al. |
| 2014/0254881 | A1 | 9/2014 | Jin |
| 2014/0254882 | A1 | 9/2014 | Jin |
| 2014/0254933 | A1 | 9/2014 | Jin |

OTHER PUBLICATIONS

Dong et al., "Adaptive object detection and visibility improvement in foggy image", Journal of Multimedia, vol. 6, No. 1, Feb. 2011.*

Wu, "Fish detection in underwater video of Benthic Habitats in Virgin Islands", University of Miami, May 2012.*

Barnes, et al., "PatchMatch: A Randomized Correspondence Algorithm for Structural Image Editing", ACM SIGGRAPH 2009 Papers (New Orleans, Louisiana, Aug. 3-7, 2009), Aug. 3, 2009, 11 pages.

Barnes, et al., "The Generalized PatchMatch Correspondence Algorithm", European Conference on Computer Vision, Sep. 2010, Retrieved from <http://gfx.cs.princeton.edu/pubs/Barnes_2010_TGP/generalized_pm.pdf> on Sep. 9, 2010, 14 pages.

Brox, et al., "Large Displacement Optical Flow: Descriptor Matching in Variational Motion Estimation", IEEE Transactions on Pattern Analysis and Machine Intelligence, 2010, 2011, 14 pages.

Fattal, "Single Image Dehazing", presented at the ACM SIGGRAPH, Los Angeles, California, 2008., 9 pages.

He, et al., "Computing Nearest-Neighbor Fields via Propagation-Assisted KD-Trees", CVPR 2012, 2012, 8 pages.

He, et al., "Single Image Haze Removal Using Dark Channel Prior", In Computer Vision and Pattern Recognition, IEEE Conference on, 2009, 8 pages.

He, et al., "Statistics of Patch Offsets for Image Completion", ECCV 2012, 2012, 14 pages.

Korman, et al., "Coherency Sensitive Hashing", ICCV 2011, 2011, 8 pages.

Olonetsky, et al., "TreeCANN—k-d tree Coherence Approximate Nearest Neighbor algorithm", European Conference on Computer Vision, 2012, 14 pages.

Xu, et al., "Motion Detail Preserving Optical Flow Estimation", IEEE Transactions on Pattern Analysis and Machine Intelligence, 34(9), 2012, 8 pages.

"Non-Final Office Action", U.S. Appl. No. 13/675,844, Dec. 19, 2014, 10 pages.

"Non-Final Office Action", U.S. Appl. No. 13/794,125, Oct. 24, 2014, 19 pages.

"Non-Final Office Action", U.S. Appl. No. 13/794,219, Feb. 12, 2015, 28 pages.

"Non-Final Office Action", U.S. Appl. No. 13/794,300, Mar. 11, 2015, 18 pages.

"Notice of Allowance", U.S. Appl. No. 13/794,125, Jan. 30, 2015, 7 pages.

* cited by examiner

OPTICAL FLOW ACCOUNTING FOR IMAGE HAZE

BACKGROUND

Computing the optical flow between images is a common technique used to infer the apparent motion between the images and compute a motion field for image processing and computer graphics applications, such as for optical flow registration, which is useful for image tracking, motion segmentation, and other motion processing applications. A motion determination between images can be utilized to track object motion, such as in video frames. For example, in a robotics application, cameras may capture two or more separate images of a scene and/or subject from slightly different perspectives and combine the separate images into one image to smooth and/or reduce noise in the images.

Conventional optical flow algorithms do not account for haze caused by atmospheric particles that obscure images of outdoor scenes, such as fog and smoke. Standard processing ignores the presence of haze that can degrade images, and computes the optical flow between images assuming that the images are free of haze, fog, smoke, and the like. The conventional optical flow algorithms also assume color consistency and image contrast between images, which also assumes that consecutive image frames have consistent haze interference in the presence of haze. However, an object may appear differently from one image to the next due to motion of the object and/or fog or smoke drift that changes the visual appearance of the object, which may not be recognized as the same object from one image to the next. For example, a car may appear blurry in fog in one image and suddenly part of the car is clear in a next image as the car emerges from the fog. The image pixels that display as the part of the car emerging from the fog change color consistency and contrast, and may not be recognized for pixel correspondence during image processing as the same car from one image to the next.

Techniques for haze removal are used with graphics and computer vision applications to improve the quality and visibility of images or videos. Haze removal techniques (also referred to as de-hazing) can also serve as a preprocessing step for improving high-level vision or graphics applications, such as for feature extraction, image correspondence, object recognition, image editing, and the like. However, applying haze removal algorithms or techniques to image sequences or video frames can cause incoherent results across the sequences or frames, where single image de-hazing does not take temporal consistency into consideration.

SUMMARY

This Summary introduces features and concepts of optical flow accounting for image haze, which is further described below in the Detailed Description and/or shown in the Figures. This Summary should not be considered to describe essential features of the claimed subject matter, nor used to determine or limit the scope of the claimed subject matter.

Optical flow accounting for image haze is described. In embodiments, digital images may include objects that are at least partially obscured by a haze that is visible in the digital images, and an estimate of light that is contributed by the haze in the digital images can be determined. The haze can be cleared from the digital images based on the estimate of the light that is contributed by the haze, and clearer digital images can be generated. An optical flow between the clearer digital images can then be computed, and the clearer digital images refined based on the optical flow to further clear the haze from the images in an iterative process to improve visibility of the objects in the digital images.

In embodiments, the digital images may be of an outdoor scene and the haze that is visible in the digital images can be atmospheric particles, such as fog, smoke, smog, and/or some form of water, such as water droplets or mist. Alternatively, the digital images may be of an underwater scene and the haze that is visible in the digital images is water that scatters indirect light, which appears visually as a haze. Initially, a percentage of the haze can be cleared from each of the digital images independently to generate the clearer digital images before the optical flow between the clearer digital images is computed. The haze, or a percentage of the haze, can be cleared from the digital images so that an object in a first digital image is recognized as the same object in a second digital image, where the haze partially obscures the object differently in each of the first and second digital images.

BRIEF DESCRIPTION OF THE DRAWINGS

Embodiments of optical flow accounting for image haze are described with reference to the following Figures. The same numbers may be used throughout to reference like features and components that are shown in the Figures.

DETAILED DESCRIPTION

Embodiments of optical flow accounting for image haze are described and may be implemented by any type of device that supports image processing, such as a computer, a server, or other type of processing device. An image processing application includes a clear images algorithm that combines image de-hazing and computing an optical flow for digital images, such as between images that include objects which are at least partially obscured by a haze that is visible in the digital images. The digital images may be of an outdoor scene, and haze that is visible in the images may be caused by atmospheric particles, such as fog, smoke, smog, and/or water in the form of water droplets or mist. Alternatively, the digital images may be of an underwater scene and haze that is visible in the images is water that scatters indirect light, which is captured in the images by a camera.

The clear images algorithm is also implemented as a combined iterative process that computes the optical flow between the digital images and then refines the digital images based on the optical flow to improve the visibility of the objects that are obscured by the haze. The iterative combination of image de-hazing and computing optical flow for digital images outperforms conventional optical flow algorithms in terms of motion estimation, and outperforms single image de-hazing techniques for image restoration. The clear images algorithm combines image haze clearing and optical flow algorithms to account for haze interference in digital images and can optimize the images approximately simultaneously.

While features and concepts of optical flow accounting for image haze can be implemented in any number of different devices, systems, networks, environments, and/or configurations, embodiments of optical flow accounting for image haze are described in the context of the following example devices, systems, and methods.

Figure 1:
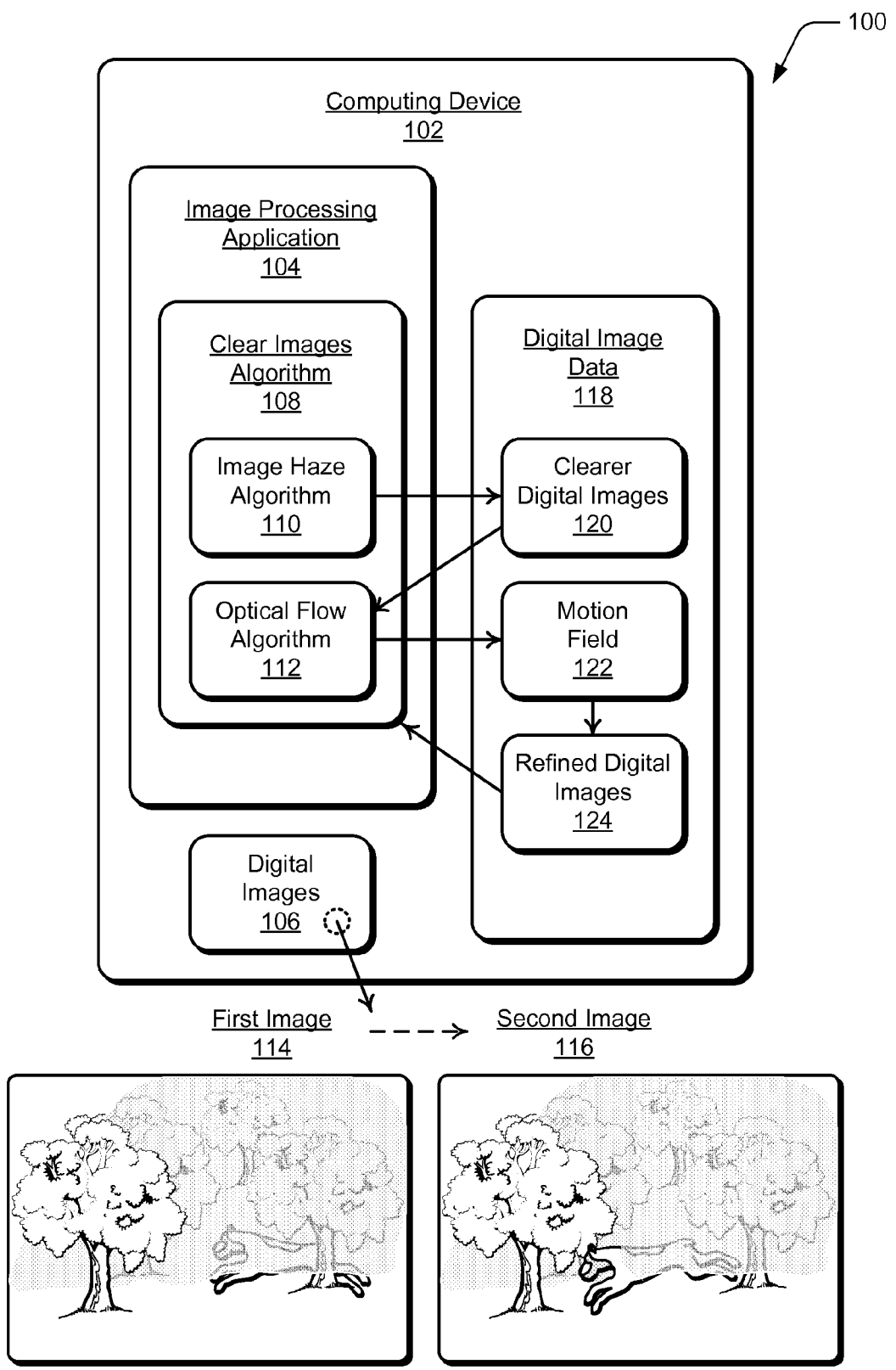
FIG. 1 illustrates an example system in which embodiments of optical flow accounting for image haze can be implemented.

FIG. 1 illustrates an example system 100 in which embodiments of optical flow accounting for image haze can be implemented. The system 100 includes an example computing device 102 that includes an image processing application 104, which may implement various algorithms to process digital images 106. The example device may be any type of computer and/or processing device, and can be implemented with various components, such as a processing system and memory, as well as with any number and combination of differing components as further described with reference to the example device shown in FIG. 5.

In this example system, the image processing application 104 includes a clear images algorithm 108, which incorporates an image haze algorithm 110, and an optical flow algorithm 112 to implement embodiments of optical flow accounting for image haze. Although shown and described as separate algorithms of the image processing application and/ or the clear images algorithm, any one or more of the algorithms may be implemented together and/or independent of the image processing application. Alternatively, the image processing application 104 may be implemented without the algorithms, yet generally be implemented to perform the functions and operations of the algorithms.

The image processing application 104 and the various algorithms can be implemented as a software application, modules, or components for image processing, and can be maintained at the computing device 102 as executable instructions that are stored on computer-readable storage media, such as any suitable memory device or electronic data storage. Additionally, the image processing application 104 and algorithms can be executed with a processing system of the computing device 102 to implement embodiments of optical flow accounting for image haze.

The digital images 106 can include any type of images, such as two video frames that are consecutive or close together in time. Consecutive images will typically include subject matter that overlaps, such as the background of the images, and objects that may be moving in the foreground. The apparent motion of an object, as represented by the displacement from one image to the next, may be a short distance in the images. Alternatively or in addition, the camera itself may move to capture a slightly different angle of the object, which gives the appearance of object motion from one image to the next. In some instances, an object may move a longer distance from one image to the next, such as when a car passes in front of the camera. Additionally, an object and/or the camera may rotate while the images are captured, which lends to high-order motions that include rotation motions and similarity, affine, and projective transformations.

In the examples described herein of optical flow accounting for image haze, the digital images 106 are referenced as a first image 114 and a second image 116 that illustrate the motion of a dog (e.g., an object that gives the appearance of motion between the digital images). Additionally, the digital images depict an outdoor scene and have a visible haze that at least partially obscures objects in the images, such as some of the trees and part of the dog. As noted above, the haze that is visible in the digital images may be caused by atmospheric particles, such as fog, smoke, smog, and/or water in the form of water droplets or mist. The first and second digital images are described merely for illustrative purposes, and it should be noted that aspects of optical flow accounting for image haze can be expanded and applied to any number of digital images.

In embodiments, the image processing application 104 (and/or the algorithms of the image processing application) are described as creating, generating, determining, and/or modifying various digital image data 118 for optical flow accounting for image haze. The details of the image processing application and/or algorithms interaction with the various digital image data are described and illustrated in examples of the first and second images 114, 116 with reference to FIGS. 2 and 3.

Generally, the image haze algorithm 110 of the clear images algorithm 108 is implemented to determine an estimate of light that is contributed by the haze in the digital images, and then clear the haze from the digital images based on the estimate of the haze contribution of light to generate clearer digital images 120. An example of the haze initially cleared from the digital images is described and illustrated with reference to FIG. 2. The optical flow algorithm 112 of the clear images algorithm 108 is implemented to compute an optical flow as the motion field 122 between the clearer digital images 120. The clear images algorithm 108 is implemented to then refine the clearer digital images 120 based on the optical flow to further clear the haze from the digital images. The refined digital images 124 are generated to improve the visibility of the objects that are obscured by the haze in the images. An example of combined computing the optical flow for the digital images and further clearing the image haze is described and illustrated with reference to FIG. 3.

Figure 2:
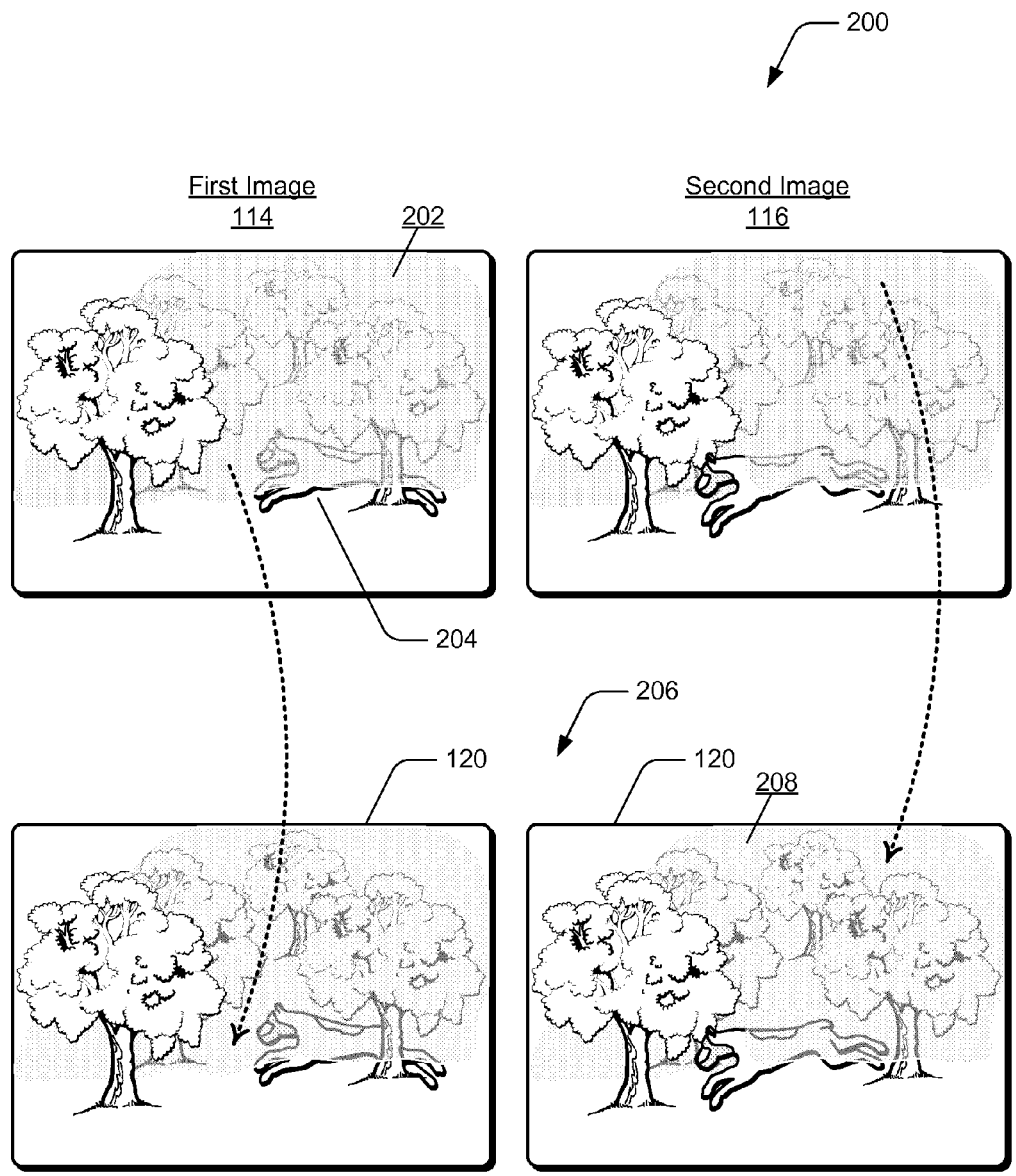
FIG. 2 illustrates an example of haze initially cleared from digital images in accordance with one or more embodiments.

FIG. 2 illustrates an example 200 of haze initially cleared from digital images to generate clearer digital images. For example, the first and second images 114, 116 (described with reference to FIG. 1) have a visible haze 202 that at least partially obscures objects in the images, such as some of the trees and part of the dog 204. In the first image 114, the dog 204 is mostly obscured by the haze 202 and then begins to emerge from the haze in the second image 116.

The clear images algorithm 108 is implemented as an alternating minimization algorithm that efficiently optimizes the following cost function:

$$\{u, S_1, S_2, t_1, t_2\} = \arg\min_{u,v,S_1,S_2,t_1,t_2} + \Phi(S_1(x) - S_2(x+u)) +$$

$$\lambda_1 \Phi(\nabla u) + \lambda_2 (|t_1 - \tilde{t}_1|^2 + |t_2 - \tilde{t}_2|^2) + t_1^T L_1 t_1 + t_2^T L_2 t_2 +$$

$$\|I_1 - t_1 S_1 - (1 - t_1) \text{ Air}\|^2 + \|I_2 - t_2 S_2 - (1 - t_2) \text{ Air}\|^2$$

Initially, given two digital images 106 as an input (e.g., the first and second images 114, 116), the image haze algorithm 110 of the clear images algorithm 108 is implemented to determine an estimate of light that is contributed by the haze 202 in the first and second images, and then clear the haze from the digital images to generate the clearer digital images 120 based on the estimate of the light that is contributed by the haze. The image haze algorithm 110 can initially clear a percentage of the haze from each of the digital images independently to generate the clearer digital images before an optical flow is computed between the digital images.

In implementations, different algorithms and techniques can be implemented to de-haze or clear images. One haze removal technique utilizes the low-intensity portions of an image to remove haze from the image, described as a single image haze removal technique that uses a dark channel of the image. In an image that is at least partially visually obscured by a haze, some pixels or image patches will typically have a low intensity in at least one red, green, or blue (RGB) color channel. The intensity of these pixels in the color channel is mainly contributed by ambient light that is reflected by atmospheric particles (e.g., smoke or water) that appear as the haze in the image, and these pixels provide an accurate estimation of the overall haze transmission in the image.

The minimum intensity in the pixels and/or image patches has a very low value, and tends to be zero. This low intensity portion of the image is often due to shadows, objects that are typically colorful but lack color in the image, and dark objects or surfaces in the image. The haze in an image will typically cause these objects to have a higher intensity, due to the reflected light. Based on an estimation of the atmospheric reflected light that is present in the image, and the low intensity portion of the image, an estimation of the transmission of the haze can be determined, and then removed. For example, the first and second images 114, 116 are shown at 206 as an illustration of the clearer digital images 120 having at least some of the haze 202 cleared from the images. The haze 208 in the clearer digital images is representative of a lighter and/or clearer haze that may still partially obscure some of the objects in the images.

Figure 3:
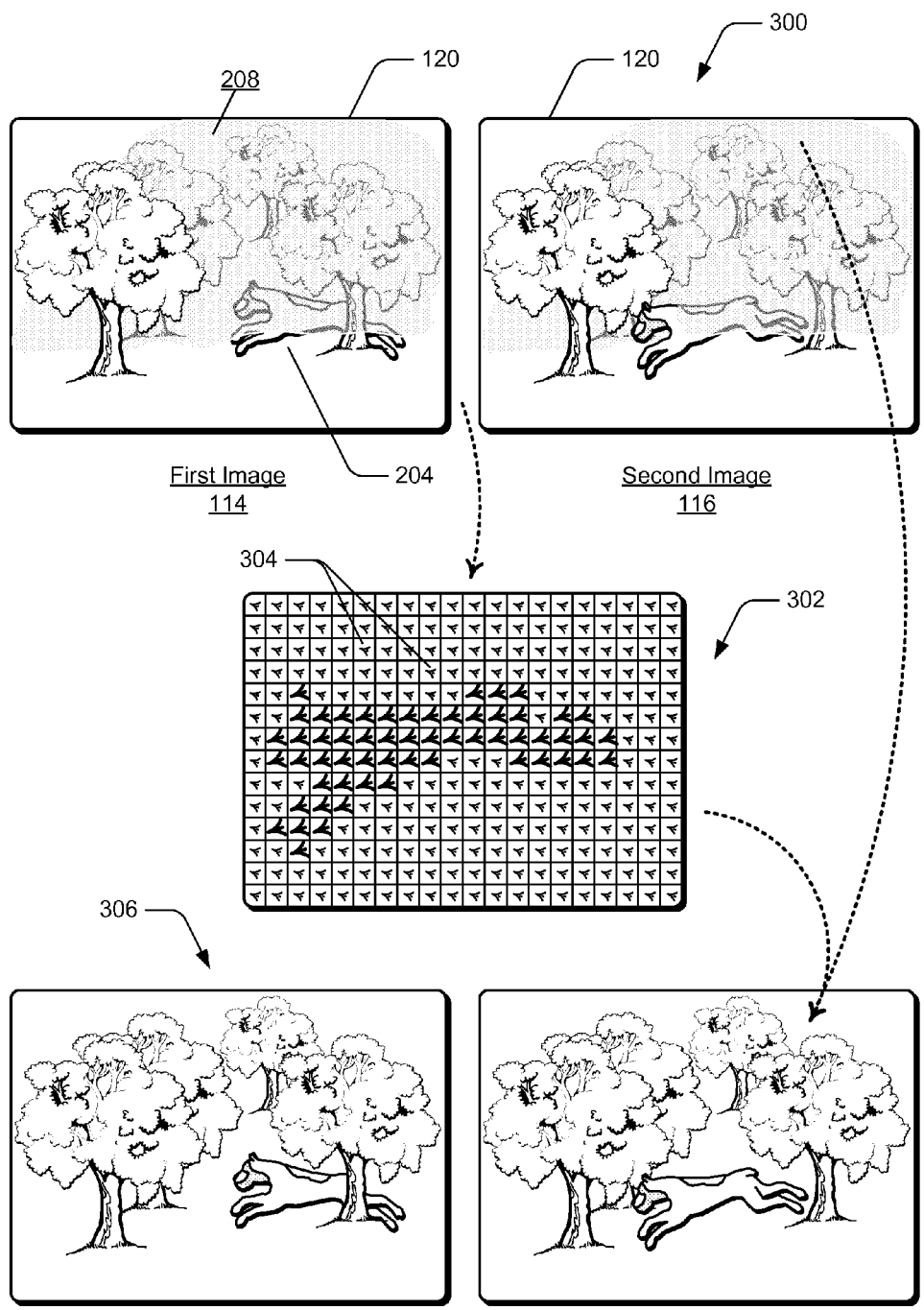
FIG. 3 illustrates an example of combined computing an optical flow for digital images and further clearing image haze and in accordance with one or more embodiments.

FIG. 3 illustrates an example 300 of combined computing an optical flow for the digital images and further clearing the image haze to improve the visibility of the objects that are obscured by the haze in the images. For example, the first and second images 114, 116 are again shown as the clearer digital images 120 (as described with reference to FIG. 2) that have a lighter visible haze 208 that partially obscures some of the objects in the images. The optical flow algorithm 112 of the clear images algorithm 108 is implemented to compute an optical flow of the images as a motion field 302, which is an illustration of the motion field 122.

The motion field 302 reflects the apparent motion of objects between the first and second images 114, 116, such as the motion of the dog 204 and the lack of motion of the background and trees. Motion data of the apparent motion of the objects between the digital images includes vectors that define the motion field. For a point $p_o$ on an object that moves with a velocity $v_o$, then the imaged point $p_i$ can be assigned a vector $v_i$ to indicate its 2D translation movement on a plane of an image. The motion field 302 is computed between the first and second images 114, 116, and the direction and magnitude of optical flow at each pixel and/or patch location is represented by the direction and length of arrows 304 in the motion field. Patches of a digital image may be considered as each pixel of the image, or may be a larger region of the image that includes a grid of multiple pixels.

The optical flow algorithm 112 of the clear images algorithm 108 is implemented to compute an optical flow (e.g., the motion field 302) between the clearer digital images 120 by optimizing the following cost function:

$$u = \mathrm{argmin}_{u} \Phi(S_1(x) - S_2(x+u)) + \lambda_1 \Phi(\nabla u)$$

The clear images algorithm 108 is also implemented to refine the clearer digital images based on the optical flow to further clear the haze from the clearer digital images as shown at 306. In implementations, the clear images algorithm 108 refines the digital images by optimizing the following cost function:

$$\{S_1, S_2\} = \mathrm{argmin}_{S_1, S_2} + \Phi(S_1(x) - S_2(x+u)) + \lambda_1 \Phi(\nabla u) +$$
$$\|I_1 - t_1 S_1 - (1-t_1)\,\mathrm{Air}\|^2 + \|I_2 - t_2 S_2 - (1-t_2)\,\mathrm{Air}\|^2$$

The clear images algorithm 108 (e.g., and the algorithms thereof) is implemented to reiterate computing the optical flow between the clearer digital images and refining the clearer digital images based on the optical flow as an iterative process to improve visibility of the objects in the digital images. For example, the first and second images shown at 306 have been cleared of the haze that obscured the objects in the images, while maintaining the temporal correspondence of the objects in the images based on the combined iterative process to compute the optical flow and clear the haze from the digital images. The image processing application 104 (e.g., and the algorithms thereof) can then recognize an object in a first digital image as the same object in a second digital image based on the haze being cleared from the digital images.

Example method 400 is described with reference to FIG. 4 in accordance with one or more embodiments of optical flow accounting for image haze. Generally, any of the services, components, modules, methods, and operations described herein can be implemented using software, firmware, hardware (e.g., fixed logic circuitry), manual processing, or any combination thereof. Example methods may be described in the general context of executable instructions stored on computer-readable storage media that is local and/or remote to a computer processing system, and implementations can include software applications, programs, functions, and the like.

Figure 4:
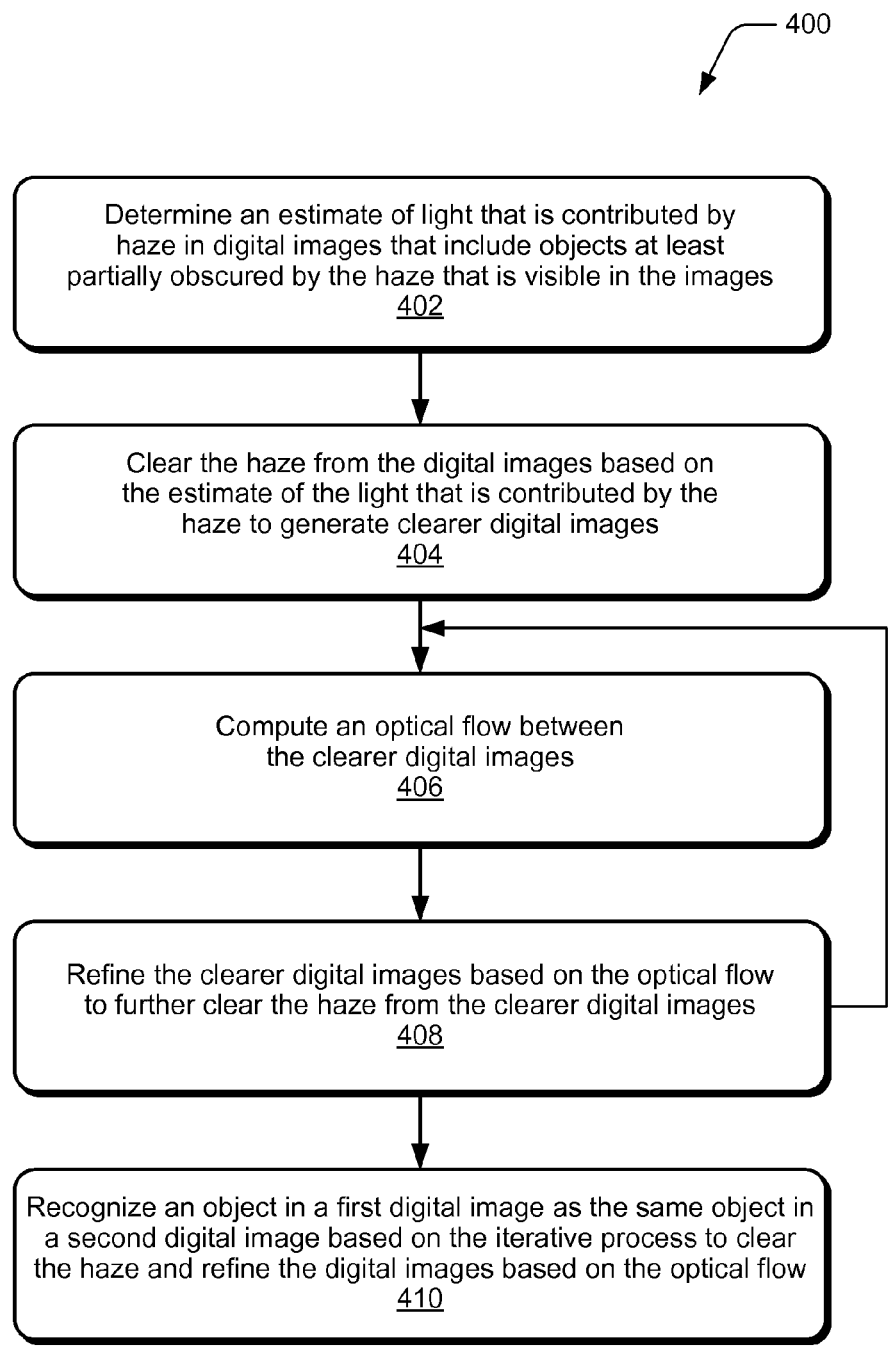
FIG. 4 illustrates example method(s) of optical flow accounting for image haze in accordance with one or more embodiments.

FIG. 4 illustrates example method(s) 400 of optical flow accounting for image haze, and is generally described with reference to an image processing application. The order in which the method is described is not intended to be construed as a limitation, and any number or combination of the method operations can be combined in any order to implement a method, or an alternate method.

At 402, an estimate is determined of the light that is contributed by haze in digital images that include objects at least partially obscured by the haze that is visible in the images. For example, the image haze algorithm 110 of the clear images algorithm 108 at the computing device 102 (FIG. 1) determines an estimate of the light that is contributed by the haze 202 in the first and second images 114, 116 that include the objects at least partially obscured by the haze that is visible in the images. As described above, the digital images may be of an outdoor scene and the haze that is visible in the images may be atmospheric particles, such as fog, smoke, smog, and/or some form of water, such as water droplets or mist. Alternatively, the digital images may be of an underwater scene and the haze that is visible in the images is water that scatters indirect light, which appears visually as the haze. The haze in digital images may obscure (at least partially) an object differently from one image to the next, and the object may not be recognized as the same object during image processing.

At 404, the haze is cleared from the digital images based on the estimate of the light that is contributed by the haze to generate clearer digital images. For example, the image haze algorithm 110 of the clear images algorithm 108 initially clears at least a percentage of the haze 202 from each of the first and second images 114, 116 independently to generate the clearer digital images 120 (also shown as the clearer digital images at 206 in FIG. 2).

At 406, an optical flow between the clearer digital images is computed. For example, the optical flow algorithm 112 of the clear images algorithm 108 at the computing device 102 computes the optical flow of the first and second images 114, 116 as the motion field 122 (also shown as the motion field 302 in FIG. 3). The motion field 302 reflects the apparent motion of the objects between the images, such as the motion of the dog 204 and the lack of motion of the background and trees.

At 408, the clearer digital images are refined based on the optical flow to further clear the haze from the clearer digital images. For example, the clear images algorithm 108 of the image processing application 104 at the computing device 102 reiterates computing the optical flow between the digital images (at 406) and refining the clearer digital images based on the optical flow to improve visibility of the objects in the digital images.

At 410, an object in a first digital image is recognized as the same object in a second digital image based on the iterative process to clear the haze and refine the digital images based on the optical flow. For example, the clear images algorithm 108 of the image processing application 104 can recognize an object, such as the dog 204, in the first image 114 as the same object in a second image 116 based on the haze being cleared from the digital images. The first and second images shown at 306 (FIG. 3) have been cleared of the haze that obscured the objects in the images, while maintaining the temporal correspondence of the objects in the images based on the combined iterative process to compute the optical flow and clear the image haze from the digital images.

Figure 5:
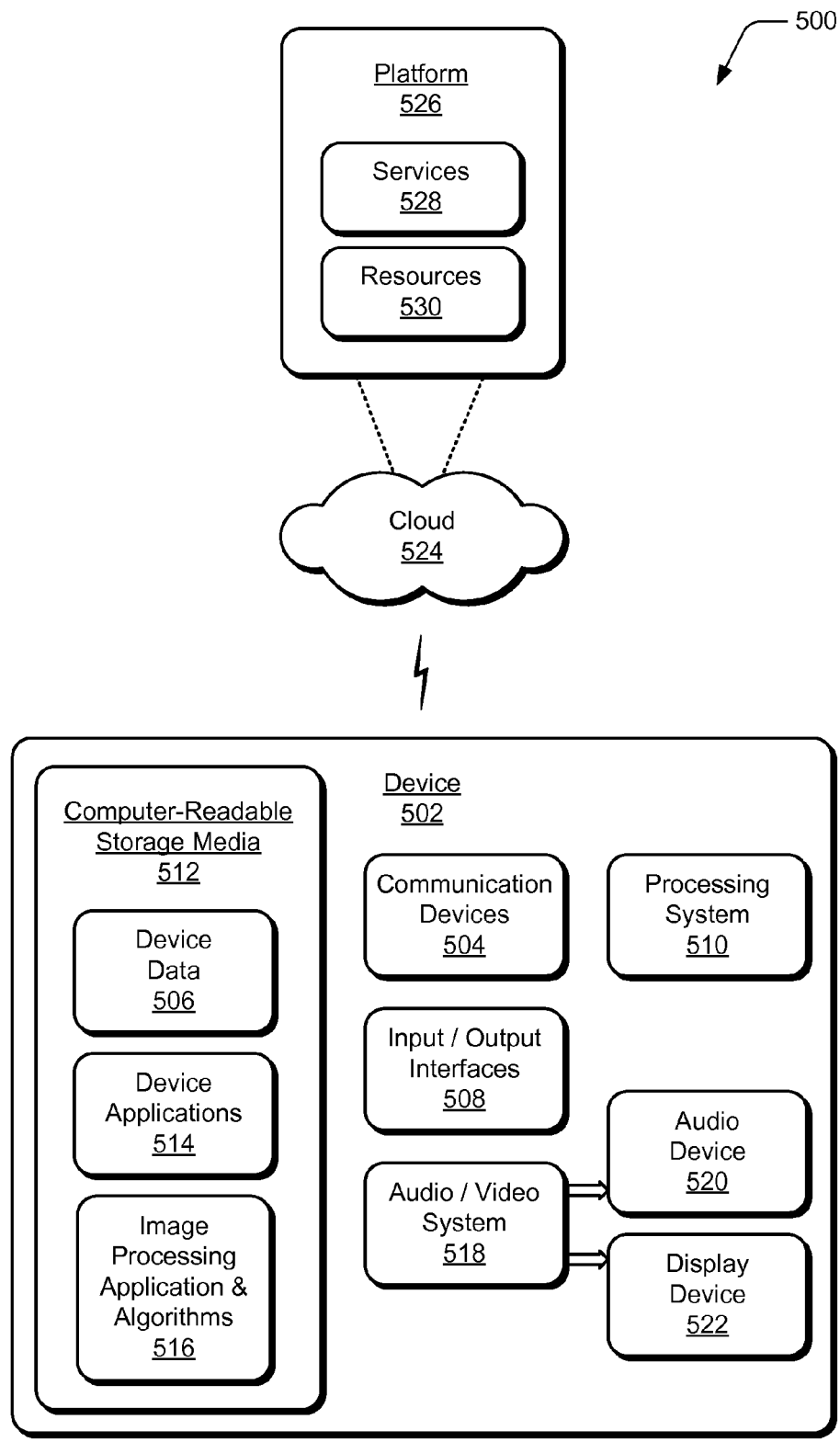
FIG. 5 illustrates an example system with an example device that can implement embodiments of optical flow accounting for image haze.

FIG. 5 illustrates an example system 500 that includes an example device 502, which can implement embodiments of optical flow accounting for image haze. The example device 502 can be implemented as any of the devices and/or servers described with reference to the previous FIGS. 1-4, such as any type of computer, server, processing device, client device, mobile device, tablet, computing, communication, and/or other type of device. For example, computing device 102 shown in FIG. 1 may be implemented as the example device 502.

The device 502 includes communication devices 504 that enable wired and/or wireless communication of device data 506, such as the digital images and the digital image data that is stored on the device. The communication devices 504 can also include transceivers for cellular phone communication and for network data communication.

The device 502 also includes input/output (I/0) interfaces 508, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The device 502 also includes computer-readable storage media 512, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 512 provides storage of the device data 506 and various device applications 514, such as an operating system that is maintained as a software application with the computer-readable storage media and executed by the processing system 510. In this example, the device applications also include an image processing application and algorithms 516 that implement embodiments of optical flow accounting for image haze, such as when the example device 502 is implemented as the computing device 102 shown in FIG. 1. Examples of the image processing application and algorithms 516 are the image processing application 104, the clear images algorithm 108, the image haze algorithm 110, and the optical flow algorithm 112 at the computing device 102, as described with reference to FIGS. 1-4.

The device 502 also includes an audio and/or video system 518 that generates audio data for an audio device 520 and/or generates display data for a display device 522. The audio device and/or the display device include any devices that process, display, and/or otherwise render audio, video, display, and/or image data. In implementations, the audio device and/or the display device are integrated components of the example device 502. Alternatively, the audio device and/or the display device are external, peripheral components to the example device.

In embodiments, at least part of the techniques described with reference to optical flow accounting for image haze may be implemented in a distributed system, such as over a "cloud" 524 in a platform 526. The cloud 524 includes and/or is representative of the platform 526 for services 528 and/or resources 530. For example, the services 528 and/or the resources 530 may include any of the image processing application and algorithms 516, as well as the digital images 106 and the digital image data 118 described with reference to FIG. 1.

The platform 526 abstracts underlying functionality of hardware, such as server devices (e.g., included in the services 528) and/or software resources (e.g., included as the resources 530), and connects the example device 502 with other devices, servers, etc. The resources 530 may also include applications and/or data that can be utilized while computer processing is executed on servers that are remote from the example device 502. Additionally, the services 528 and/or the resources 530 may facilitate subscriber network services, such as over the Internet, a cellular network, or Wi-Fi network. The platform 526 may also serve to abstract and scale resources to service a demand for the resources 530 that are implemented via the platform, such as in an interconnected device embodiment with functionality distributed throughout the system 500. For example, the functionality may be implemented in part at the example device 502 as well as via the platform 526 that abstracts the functionality of the cloud 524.

Although embodiments of optical flow accounting for image haze have been described in language specific to features and/or methods, the appended claims are not necessarily limited to the specific features or methods described. Rather, the specific features and methods are disclosed as example implementations of optical flow accounting for image haze.

The invention claimed is:

1. A method, comprising:
   determining an estimate of light that is contributed by haze in digital images that include one or more objects at least partially obscured by the haze that is visible in the digital images;
   clearing the haze from the digital images based on the estimate of the light that is contributed by the haze to generate clearer digital images;
   computing an optical flow between the clearer digital images; and
   refining the clearer digital images based on the optical flow to further clear the haze from the clearer digital images.

2. A method as recited in claim 1, wherein clearing the haze from the digital images includes initially clearing a percentage of the haze from each of the digital images independently to generate the clearer digital images before said computing the optical flow between the clearer digital images.

3. A method as recited in claim 1, further comprising:
   reiterating said computing the optical flow between the clearer digital images and said refining the clearer digital images based on the optical flow as an iterative process to improve visibility of the one or more objects in the digital images.

4. A method as recited in claim 3, further comprising:
   recognizing an object in a first digital image as the same object in a second digital image based on said clearing the haze from the digital images that at least partially obscures the object differently in each of the first and second digital images.

5. A method as recited in claim 1, wherein the digital images are of an outdoor scene and the haze that is visible in the digital images is atmospheric particles that include one or more of fog, smoke, smog, or water.

6. A method as recited in claim 1, wherein the digital images are of an underwater scene and the haze that is visible in the digital images is water that scatters indirect light.

7. A computing device, comprising:
   a memory configured to maintain digital images that include one or more objects at least partially obscured by a haze that is visible in the digital images;
   a processing system to implement an image processing application that is configured to:
   clear the haze from the digital images to generate clearer digital images;
   compute an optical flow between the clearer digital images; and
   refine the clearer digital images based on the optical flow to further clear the haze from the clearer digital images.

8. A computing device as recited in claim 7, wherein the image processing application is configured to:
   determine an estimate of light that is contributed by the haze in the digital images; and
   clear the haze from the digital images based on the estimate of the light that is contributed by the haze.

9. A computing device as recited in claim 8, wherein the image processing application is configured to initially clear a percentage of the haze from the digital images to generate the clearer digital images.

10. A computing device as recited in claim 7, wherein the image processing application is configured to clear the haze from each of the digital images independently before the optical flow is computed.

11. A computing device as recited in claim 7, wherein the image processing application is configured to compute the optical flow between the clearer digital images and refine the clearer digital images based on the optical flow as an iterative process to improve visibility of the one or more objects in the digital images.

12. A computing device as recited in claim 11, wherein the image processing application is configured to recognize an object in a first digital image as the same object in a second digital image based on the haze cleared from the digital images that at least partially obscures the object differently in each of the first and second digital images.

13. A computing device as recited in claim 7, wherein the image processing application is configured to compute the optical flow as a motion field based on apparent motion of the one or more objects between the clearer digital images.

14. A computing device as recited in claim 7, wherein the digital images are of an outdoor scene and the haze that is visible in the digital images is atmospheric particles that include one or more of fog, smoke, smog, or water.

15. A computing device as recited in claim 7, wherein the digital images are of an underwater scene and the haze that is visible in the digital images is water that scatters indirect light.

16. Computer-readable storage memory device comprising algorithms stored as instructions that are executable and, responsive to execution of the instructions at a computing device, the computing device performs operations of the algorithms comprising to:
   clear haze from digital images that include one or more objects at least partially obscured by the haze that is visible in the digital images to generate clearer digital images;
   compute an optical flow between the clearer digital images; and
   refine the clearer digital images based on the optical flow to further clear the haze from the clearer digital images.

17. Computer-readable storage memory device as recited in claim 16, wherein the computing device performs the operations of the algorithms further comprising to:
   determine an estimate of light that is contributed by the haze in the digital images; and
   clear the haze from the digital images based on the estimate of the light that is contributed by the haze.

18. Computer-readable storage memory device as recited in claim 16, wherein the computing device performs the operations of the algorithms further comprising to:
   initially clear a percentage of the haze from each of the digital images independently to generate the clearer digital images before the optical flow is computed; and
   compute the optical flow between the clearer digital images.

19. Computer-readable storage memory device as recited in claim 16, wherein the computing device performs the operations of the algorithms further comprising to compute the optical flow between the digital images and refine the digital images based on the optical flow as an iterative process to improve visibility of the one or more objects in the digital images.

20. Computer-readable storage memory device as recited in claim 19, wherein the computing device performs the operations of the algorithms further comprising to recognize an object in a first digital image as the same object in a second digital image based on the haze cleared from the digital images that at least partially obscures the object differently in each of the first and second digital images.

\* \* \* \* \*